June 23, 1970     W. DETTINGER     3,516,760
METHOD OF SEALING PISTON PUMPS
Filed Jan. 29, 1968
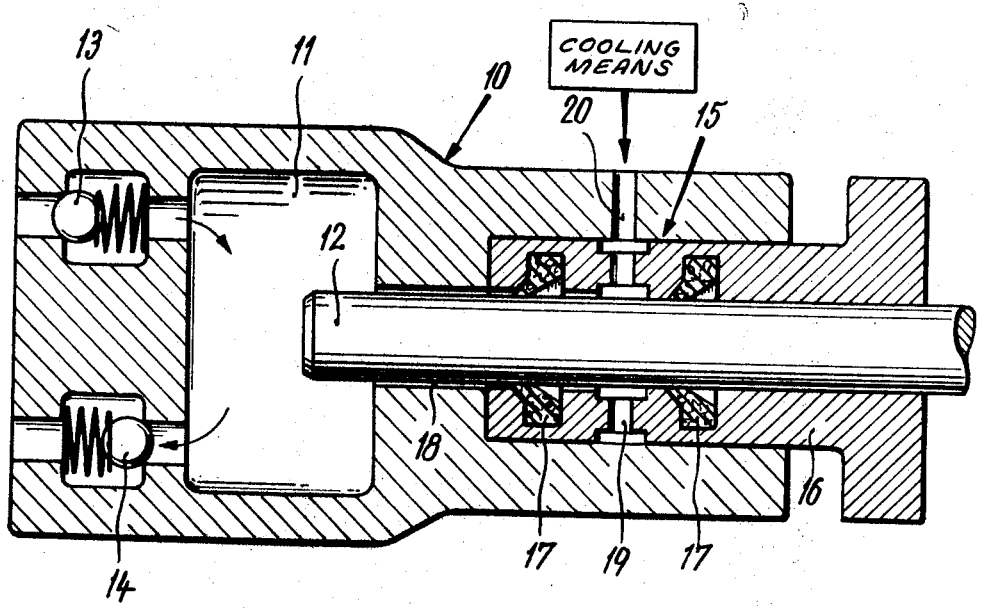
INVENTOR:
Willi Dettinger
By Michael S. Striker
Attorney United States Patent Office 3,516,760
Patented June 23, 1970

3,516,760
METHOD OF SEALING PISTON PUMPS
Willi Dettinger, Urach, Germany, assignor to Pumpenfabrik Urach, Urach, Wurttemberg, Germany
Filed Jan. 29, 1968, Ser. No. 701,453
Int. Cl. F04b 21/00; E21b 33/00
U.S. Cl. 417—53
8 Claims

ABSTRACT OF THE DISCLOSURE

A method of scavenging and sealing corrodible parts of sliding surfaces of piston pumps, especially stuffing boxes, when conveying highly corrosive reaction liquids, especially carbamate, wherein a reaction participant, especially ammonia, is passed into the annular gap surrounding the pump piston adjacent to the pump chamber so as substantially to prevent the reaction liquid, especially carbamate, from coming in contact with the corrodible parts, especially those of a stuffing box.

---

The present invention relates to a method of scavenging and sealing and possibly also for lubricating the sliding surfaces, stuffing boxes or the like of piston pumps which are employed for conveying reaction liquids of normally gaseous but liquefied reaction media which result in normally solid reaction products which, however, melt at higher temperatures. Such reaction liquids often have the disadvantage of affecting, for example, the packings of the pumps employed for conveying these liquids so that these packings will be ruined within a short time. These liquids generally contain solid substances which at a sufficiently high temperature form a homogenous fluid with the reaction liquid but recrystallize at cold points and then have a corrosive action.

For sealing plunger pumps it is known to supply a blocking liquid, for example, water or oil, to the area adjacent to a pump packing, for example, in beat with the pump, and to force it along the plunger piston into the pump chamber, for example, for the purpose of preventing the main liquid to be conveyed by the pump from reaching the packing. However, this blocking liquid may easily become mixed with the main liquid which often leads to undesirable results. Thus, for example, if the blocking liquid consists of water, it may result in a dilution of the reaction liquid or in a reduction of the desired chemical output and therefore must again be excluded from the reaction liquid at a certain stage of the chemical process, for example, within a certain synthesis. Oil, on the other hand, will not mix at all with the reaction liquid and it has the tendency to decompose at the high temperatures at which the pump usually has to operate and will therefore lead to unforeseeable complications and also cause undesirable discolorations of the final product.

It is the principal object of the present invention to eliminate the above-mentioned disadvantages by preventing the reaction media or reaction liquids or their precipitates from reaching the points of a pump which may be affected by corrosion, especially the stuffing boxes and other packings, and by also preventing chemical or chemico-physical effects which might interfere with the economical operations of the apparatus including the system of the piston pump.

An important feature of the invention for attaining this object consists in employing the reaction participants in a liquefied condition for scavenging and sealing and possibly also for lubricating the corrodible parts of piston pumps, such as stuffing boxes or the like, and to supply these reaction participants to the corrodible parts in a manner so as to prevent the reaction liquid at least substantially from reaching the mentioned parts. The reaction liquid itself will thus not come into contact with the stuffing box and the latter will be protected by the liquid reaction participant from the destructive influences of the reaction liquid and thus also from the precipitates of the latter. This reaction participant may at the same time contribute to the desired chemical reactions and increase the output thereof.

An important instance in which the invention may be applied consists, for example, of reactions employing ammonia as a participant in which liquefied ammonia is to be used for scavenging, sealing, and possibly for lubricating the pump. When conveying carbamate, it is therefore another important feature of the invention to supply ammonia as a blocking liquid to the corrodible parts of the pump and especially to the stuffing box of the latter. For this purpose the invention takes advantage of the fact that each of the two basic materials of the highly corrosive carbamate, namely carbon dioxde and ammonia and especially the latter, does by itself not have any or practically any corrosive properties. In the carbamate synthesis which is an intermediate stage in the production of urea, and also in the urea synthesis itself, an excess of ammonia is employed. Therefore, there is a possibility to employ ammonia as a blocking liquid and to add a part thereof to the remaining liquid, i.e. the carbamate, not until it is located in the pump chamber.

Carbamate is used especially for producing synthetic urea to be used as a fertilizer. In almost all methods which are known for this purpose a decomposition of the carbamate occurs during which ammonia is released. If desired, this ammonia may subsequently again be returned to the carbamate to serve as a blocking or scavenging liquid for carrying out the synthesis. A separate blocking liquid is therefore not required and under certain circumstances it is also possible to return the ammonia to the carbamate without requiring any additional means.

As already generally indicated above, the use, for example, of water as a blocking liquid would reduce the rate of conversion of carbamate into urea. Since in each reaction only a certain percentage of carbamate will be converted into urea and water and a certain chemical equilibrium will occur within the reaction liquid between the carbamate on the one hand, and urea and water, on the other hand, the addition of water to the quantity of carbamate conveyed by the pump would shift the equilibrium in the direction toward the carbamate and the rate of conversion from the intermediate product carbamate to the desired end product of the synthesis, namely urea, would decrease.

The rate of conversion of carbamate into urea and water is partly determined by the molecular relations of the ammonia to carbon dioxide and water. For this reason considerably more ammonia is applied in this method than would be required by the stoichiometrical relation which amounts to 2 mol $NH_3$ to 1 mol $CO_2$. The additional insertion of ammonia during the scavenging process in the stuffing box of the carbamate pump will therefore exert a positive influence upon the synthesis from the end product of urea and water and will even increase the reaction output.

Although the present invention is preferably applicable to the conveying of carbamate, it is not limited thereto. For example, it is also within the concept of the invention to employ ammonia as a blocking or scavenging liquid also for the production of melamin. The method according to the invention may also be equally applied in other reactions in which gaseous reaction participants result in a reaction liquid, for example, in halides, hydrogen halides, olefines, or the like, that is, in such liquids which when free of water do not have any corrosive effect.

The reaction participant may, for example, be supplied in a manner known as such as a blocking liquid to the area adjacent to the pump piston and through a choke channel, especially a narrow annular channel surrounding the pump piston to the pump chamber. This should be done, however, in such a manner that the blocking liquid is supplied at a point between the packing and the pump chamber so that no carbamate or other reaction liquid will come in contact with the packing. The proper amount of blocking liquid is preferably supplied in beat with the main pump piston and this may occur either during the pressure strokes or during the suction strokes of the auxiliary pump piston while the main pump piston carries out its pressure strokes. The blocking liquid may, however, also be supplied during the pressure strokes as well as during the suction strokes of the main pump piston. In this case, a two-cylinder auxiliary pump may be provided for each cylinder of the main pump and be driven by the driving means of the latter.

If the piston of the auxiliary pump is controlled so as to supply blocking liquid during the pressure strokes of the main pumps, the auxiliary pump should be designed so as to pump the blocking liquid against the conveying pressure of the main pump. Its conveying pressure must therefore be higher than that of the main pump.

If, on the other hand, the auxiliary or scavenging pump is operated so as to carry out its pressure stroke during the suction stroke of the main pump, it only needs to produce a pressure exceeding the suction pressure of the main pump. While the main pump carries out its suction stroke, the auxiliary pump will force the blocking liquid through the narrow annular channel around the main pump piston so that this channel will be scavenged and thus cleaned during each suction stroke of the main pump.

The quantity of blocking liquid which is conveyed by the auxiliary pump is preferably adjustable, for example, by varying the length of the piston stroke of this pump. In this manner it is possible to adjust the quantity of blocking liquid which is supplied per each stroke of the main pump so as to be in accordance with the quantity required. Of course, the main pump may also be adjustable so as to vary its pump output, for example, by varying the length of the strokes of its piston.

The packing on the plunger piston of the main conveying pump may be of any desired type. The blocking liquid may, for example, be supplied radially from the outside to the stuffing-box packing through a ring or the like which is provided with apertures and then through apertures in the packing elements to the upper surface of the plunger piston from which it will then be conducted by the suction of the main pump or the pressure of the auxiliary pump to the pump chamber of the main pump so that the blocking liquid will be mixed with the corrosive liquid, and thus, particularly the ammonia will be mixed with the carbamate. The annular channel is for this purpose made of a small cross-sectional size but of the greatest possible length before it terminates into the main pump chamber.

If desired, it is also possible to provide check valve elements within the path of flow of the blocking liquid, for example, lip-shaped packings, acting in the manner of check valves which open in the direction of flow of the blocking fluid and close in the event that a reversal of this flow occurs.

The flow of the blocking liquid through the annular channel results in a scavenging and cleaning effect which removes from this channel any parts of the main liquid which might have entered therein.

In order to illustrate the new method more clearly, it is hereafter briefly described with reference to the accompanying diagrammatic drawing which by way of example shows a pump housing 10 with a pump chamber 11 therein to which the liquid to be conveyed, for example, carbamate, is supplied by the suction stroke of the plunger piston 12 via an inlet valve 13, and from which this liquid is conveyed during the pressure stroke of piston 12 into a pressure line after an outlet valve 14 has been opened.

For sealing the pump chamber 11 toward the outside, a packing 15 is provided which may consist in the usual manner of a stuffing box or other suitable means. The particular pump as illustrated is provided, for example, with a packing sleeve 16 into which lip-shaped packing means 17 are inserted into suitable recesses. Between the packing 15 and the pump chamber 11 an annular channel 18 is provided which surrounds the plunger piston 12 and has a narrow width, for example, of 1 mm. or less.

The packing sleeve 16 is further provided with several apertures 19 through which a blocking liquid, for example, ammonia, which is supplied by an auxiliary piston pump through a pipe line and an inlet opening 20 into the narrow channel 18 surrounding the piston 12 of the main pump.

This blocking liquid passes at each pressure stroke of the auxiliary pump from the inlet opening 20 through the apertures 20 and the annular channel 18 and then through the front part of the packing means 17 and prevents the corrosive medium, that is, particularly carbamate, which is conveyed through the pump chamber from passing through the channel 18 to the packing means 17.

If desired, the blocking liquid may also be passed into the annular channel 18 by providing the inlet opening 20 at a point between the packing means and the pump chamber 11.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of scavenging and sealing corrodable parts of sliding surfaces in piston pumps which are employed for conveying corrosive reaction liquids composed of at least two reactive liquid components each of which by itself is at least substantially noncorrosive, comprising the steps of conveying during the suction stroke of a piston pump into a pump chamber thereof a first liquid composed at least in part of one of said at least substantially noncorrosive liquid components of the corrosive reaction liquid; simultaneously conducting into said pump chamber under pressure and initially in contact with said sliding surfaces a second liquid composed of the other of said at least substantially noncorrosive liquid components of the reaction liquid, for subsequent admixture in said pump chamber with said first liquid component; and conveying the resulting liquid mixture out of said pump chamber during the expulsion stroke of said piston pump.

2. A method as defined in claim 1, wherein said second liquid component is ammonia.

3. A method as defined in claim 1, wherein said first liquid is carbonate and said second liquid is ammonia.

4. A method as defined in claim 1, wherein said first liquid is carbonate and said second liquid is a highly concentrated ammonia solution.

5. A method as defined in claim 2, and further comprising the step of cooling said ammonia prior to contact thereof with said sliding surfaces.

6. A method of scavenging and sealing corrodable parts of sliding surfaces in piston pumps which are employed for conveying corrosive reaction liquids composed of at least two reactive liquid components at least one of which by itself is at least substantially noncorrosive, comprising the steps of conveying during the suction stroke of a piston pump into a pump chamber thereof a first liquid composed at least in part of said other liquid component of the corrosive reaction liquid; simultaneously conducting into said pump chamber under pressure and initially in contact with said sliding surfaces a second liquid composed of said one at least substantially noncorrosive liquid component of the reaction liquid, for subsequent admixture in said pump chamber with said first liquid; and conveying the resulting liquid mixture out of said pump chamber during the expulsion stroke of said piston pump.

7. A method as defined in claim 6, wherein said one liquid component is ammonia.

8. A method of scavenging and sealing corrodable parts of sliding surfaces in piston pumps which are employed for conveying corrosive reaction liquids composed of at least two reactive liquid components at least one of which is substantially noncorrosive by itself, comprising the steps of conveying during the suction stroke of a piston pump into a pump chamber thereof liquid carbamate constituting the other of the liquid components of the corrosive reaction liquid; simultaneously conducting into said pump chamber under pressure and initially in contact with said sliding surfaces liquid ammonia constituting said one at least substantially noncorrosive liquid component of the reaction liquid, for subsequent admixture in said pump chamber with said liquid carbamate; and conveying the resulting liquid mixture out of said pump chamber during the expulsion stroke of said piston pump.

References Cited

UNITED STATES PATENTS

| 1,515,816 | 11/1924 | Smith. | |
| 2,441,708 | 5/1948 | Luaces et al. | |
| 3,081,095 | 3/1963 | Hamrick | 277—1 |

FOREIGN PATENTS 862,720  3/1961  Great Britain.

ROBERT M. WALKER, Primary Examiner

U.S. Cl. X.R.

92—154; 277—1; 417—503, 557